Nov. 27, 1923. 1,475,743

O. BROWN

PLOWSHARE

Filed April 15, 1922

Inventor
O. Brown
By D. Swift
Attorney

Patented Nov. 27, 1923.

1,475,743

UNITED STATES PATENT OFFICE.

OMER BROWN, OF CONNERSVILLE, INDIANA.

PLOWSHARE.

Application filed April 15, 1922. Serial No. 552,895.

*To all whom it may concern:*

Be it known that I, OMER BROWN, a citizen of the United States, residing at Connersville, in the county of Fayette, State of Indiana, have invented a new and useful Plowshare; and I do hereby declare the following to be a full, clear, and exact description of the invention, such as will enable others skilled in the art to which it appertains to make and use the same.

The invention relates to plow shares and has for its object to provide a plow share formed in sections and disposed on the mold board side of the plow, each section having an independent plow point, thereby providing multiple spurs, the breakage of any of which will not render the plow inoperative. Also to detachably connect the plow share sections on a bar carried by the land side bar of the plow, thereby providing means whereby any of the plow share sections may be easily and quickly removed in case of breakage and replaced with a new section. The multiple spurs also forming means whereby the earth as it is turned by the plow share and mold board will be pulverized.

With the above and other objects in view the invention resides in the combination and arrangement of parts as hereinafter set forth shown in the drawings, described and claimed, it being understood that changes in the precise embodiment of the invention may be made within the scope of what is claimed without departing from the spirit of the invention.

In the drawings:—

Figure 1:
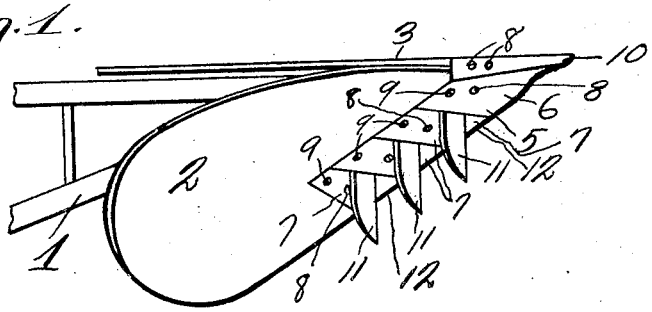
Figure 1 is a top plan view of a portion of a conventional form of plow, showing the plow share applied thereto.
Figure 2:
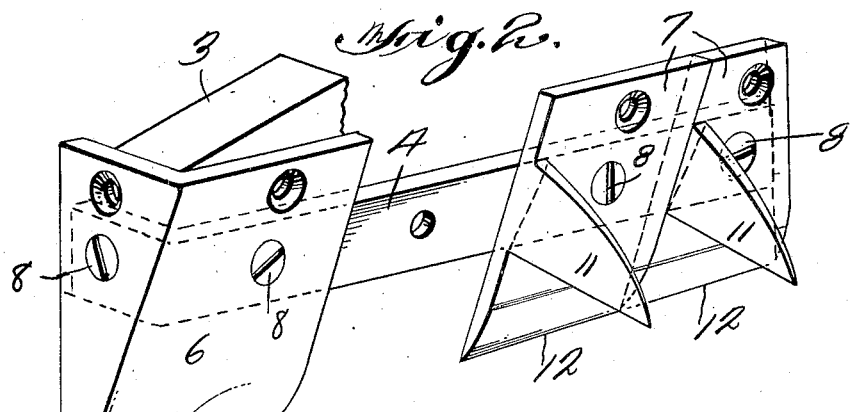
Figure 2 is a perspective view of a portion of the land side bar, showing the plow share applied thereto and one section removed.
Figure 3:
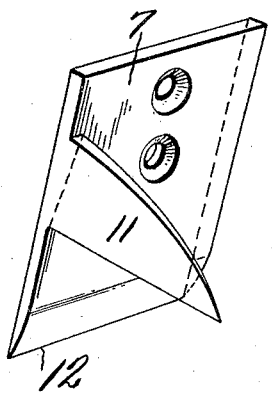
Figure 3 is a perspective view of one of the plow share sections.

Referring to the drawings, the numeral 1 designates a conventional form of plow and 2 the mold board thereof. Connected to the land side bar 3 is a plow share supporting bar 4, which bar extends rearwardly in relation to the bar beneath the mold board 2 and has secured thereto the sectional plow share 5. The plow share 5 is formed form a plurality of plates 6 and 7, which plates are detachably connected to the bar 4 by means of screws 8 and to the mold board by means of screws 9. The plate 6 is provided with a spur 10 of a conventional construction, however it has been found that when the plow point 10 is worn off or broken, the plow as a whole is practically inoperative until a new point is provided. To obviate this difficulty each plate 7 is provided with an outwardly extending and downwardly and forwardly inclined spur 11 in the form of a blade with its lower edge sharpened, therefore it will be seen that if the plow point 10 becomes worn or is broken, the spur 11 will allow the plow to be continued in use. If any of the spurs 11 become broken, the other spurs will operate thereby allowing the plow to be used until it is convenient to renew the plate and spurs. The spurs 11 also act as pulverizers during the forward movement of the plow and act upon the earth as the earth is turned by the mold board 2.

From the above it will be seen that a plow share is provided which is formed in sections which are detachably connected to the plow and provided with independent spurs, thereby allowing the plow to be continued in use after the breakage of one or more of the spurs and also allows the spurs to be renewed when convenient.

The lower edges 12 of the plate 7 are sharpened, thereby insuring the cutting of the earth and reducing the upward movement of the plow to a minimum and allowing the spurs 11 to easily pass through the earth. The spurs 11 by being inclined downwardly and forwardly assist in holding the plow in the ground as well as pulverizing the earth as it is turned by the mold board 2.

The invention having been set forth what is claimed as new and useful is:—

The combination with a plow having a land side, a mold board, of a plow share carried by said land side and disposed below the mold board, said plow share comprising a plurality of plates, said plates being in the same plane and in abutting engagement with each other, a bar connected to the land side, and to which bar the plates are detachably secured, said plates being provided with outwardly extending spurs, said spurs having their lower edges sharpened.

In testimony whereof I have signed my name to this specification in the presence of two subscribing witnesses.

OMER BROWN.

Witnesses:
JAMES C. THURMAN,
ARTHUR A. CARMICHAEL.